United States Patent [19]

Dias et al.

[11] Patent Number: 5,317,731
[45] Date of Patent: May 31, 1994

[54] INTELLIGENT PAGE STORE FOR CONCURRENT AND CONSISTENT ACCESS TO A DATABASE BY A TRANSACTION PROCESSOR AND A QUERY PROCESSOR

[75] Inventors: Daniel M. Dias, Mahopac; Ambuj Goyal, Amawalk; Francis N. Parr, Croton-on-Hudson, all of N.Y.

[73] Assignee: International Business Machines Corporation, Armonk, N.Y.

[21] Appl. No.: 660,769

[22] Filed: Feb. 25, 1991

[51] Int. Cl.⁵ .......................................... G06F 15/40
[52] U.S. Cl. ............................. 395/600; 364/282.1; 364/254.3; 364/260.2; 364/DIG. 1; 364/974.6; 395/425
[58] Field of Search ............... 364/300, 200, DIG. 1; 395/600, 650, 425

[56] References Cited

U.S. PATENT DOCUMENTS

| | | | |
|---|---|---|---|
| 4,631,673 | 12/1986 | Haas et al. | 364/300 |
| 4,648,036 | 3/1987 | Gallant | 364/300 |
| 4,714,995 | 12/1987 | Materna et al. | 364/200 |
| 4,774,661 | 9/1988 | Kumpati | 364/300 |
| 4,827,401 | 5/1989 | Hrustleh et al. | 364/200 |
| 4,876,643 | 10/1989 | McNeill et al. | 364/200 |
| 4,881,166 | 11/1989 | Thompson et al. | 364/200 |
| 5,043,871 | 8/1991 | Nishigake et al. | 364/200 |
| 5,163,148 | 11/1992 | Walls | 395/600 |

OTHER PUBLICATIONS

Korth and Silberschatz, *Database System Concepts*, 1991, McGraw Hill Chapter 12.

*Primary Examiner*—Thomas C. Lee
*Assistant Examiner*—Jack Choules
*Attorney, Agent, or Firm*—Ronald L. Drumheller; Richard M. Ludwin

[57] ABSTRACT

An apparatus, embodied in an Intelligent Page Store, for providing concurrent and consistent access to a functionally separate transaction entity and a query entity to a shared database, while maintaining a single physical copy of most of the data. The Intelligent Page Store contains shared disk storage, and an intelligent versioning mechanism allows simultaneous access by the transaction entity and the query entity to the shared data. The transaction entity is presented the current data and the query entity is presented a recent and consistent version of the data. A single copy of all but recently updated pages is maintained by the Intelligent Page Store. The query and transaction entities operate independently of each other and are separately optimized.

8 Claims, 5 Drawing Sheets

INTELLIGENT PAGE STORE FOR CONCURRENT AND CONSISTENT ACCESS TO A DATABASE BY A TRANSACTION PROCESSOR AND A QUERY PROCESSOR

Field of the Invention

This invention relates generally to simultaneous database transaction processing and query processing, and, more particularly, to functionally separating a database transaction entity and a query entity that access the same data by providing a method and apparatus called an intelligent page store that provides two access paths, one for the transaction entity and one for the query entity, and an implicit versioning mechanism, that provide the transaction entity with the most recent data and provide the query entity with a recent but consistent version of the data, while physically maintaining a single copy of most of the data.

Description of the Prior Art

In recent years the demand for database transaction processing capacity in large installations has been growing significantly. At the same time, a large fraction of new database applications have been in a relational database environment, which is also an ideal environment for supporting ad hoc queries on the database. This has given rise to a concomitant growth in the use of ad hoc unstructured queries-a trend which is expected to accelerate. Consequently, there is a growing requirement for simultaneously supporting both high volume transaction processing and unstructured queries against the same database. Therefore, a principal objective of this invention is to design an architecture that effectively supports both high volume transactions and complex queries, with minimal interference between the two, while sharing a single copy of most of the data.

Typically enterprises create and maintain their databases through a high volume of relatively simple transactions. Each transaction represents a well-understood business operation (creating a new customer record, noting an account payment or transfer). Increasingly enterprises are becoming interested in running more ad hoc unstructured queries against their online data. This is stimulated by the feasibility of writing these more complex queries in SQL. Typical applications might be: testing new market opportunities, decision support, detecting historical trends, profitability analysis etc.. These unstructured queries are characterized by:
- they are unplanned and not frequently used-performance tuning for each query is not practical
- they do not modify the operational business data
- they can execute against somewhat old database data without loss of value
- they may require large amounts of data scanning and processing-hence have long execution times compared with the standard transactions.

In Chan, A., Fox, S., Lin W. T., Nori, A. and Ries, D., "The Implementation of an Integrated Concurrency Control and Recovery Scheme", Proc. ACM SIGMOD Conf., 1982, pp. 184–191, a versioning scheme is described. In this scheme, different versions of pages are chained, and again each version is identified by the ID transaction that created it. Each query has associated with it a copy of a Completed Transaction List (CTL) that is in effect at the time of its initiation. Query access is by chasing down the chain of physical pages till a version in the queries CTL is detected. First, this requires information of completed transactions to be available to the query processor, again preventing transaction and query processing to be functionally separated Second, chasing down pages may require several I/Os. Third, in this scheme pages must be forced to disk by committing transactions. Finally, the scheme supports only page level locking for transactions. The scheme is generalized to a distributed environment in Chan, A., and Gray, R., "Implementing Distributed Read-Only Transactions", IEEE Trans. Software Engrg., Vol. SE-11, No. 2, February 1985, by using a complex scheme in which CTLs are sent between sites and are merged to create new versions of CTLs.

In Robinson, J., Thomasian, A. and Yu, P., "Elimination of Lock Contention in Relational Databases Accessed by Read-Only Queries and On-Line Update Transactions", IBM Technical Disclosure Bulletin, Vol. 31, No. 1, pp. 180–185, June 1988, an explicit page versioning method for queries and transactions that both access data by requesting locks at a common concurrency controller is described. The scheme requires knowledge of which pages are locked by transactions and queries, and when a lock contention is detected, a version is created for the query to access. For queries this is done by keeping status arrays of queries in progress and checking these arrays when a transaction makes a lock request that results in a conflict. The scheme also requires that committed updated pages by transactions be immediately accessible by queries. Essentially, this scheme requires that queries and transactions be run under a single DBMS (common concurrency control manager and buffer manager), so that locks made by queries and transactions are known to each other. The disclosure does not describe how garbage collection is is done to remove versioned pages that are no longer required.)

The general difference from the prior art outlines above and this invention is that in the prior art, queries and transactions are not mutually functionally separated. That is, in the prior art there is a single concurrency control entity that ensures consistent access among transactions and between transactions and queries. This precludes independent implementation and optimization of query and transaction processing. There is another extreme in the prior art that separates the data accessed by queries and transactions by making a complete copy of the database.

SUMMARY OF THE INVENTION

In accordance with a preferred but nonetheless illustrative embodiment demonstrating objects and features of the present invention there is provided a novel method and apparatus for simultaneous database transaction processing and query processing wherein an intelligent page store containing shared disk storage is provided. The intelligent page store provides two access paths to the shared data, one by a transaction entity and one by a query entity. In the intelligent page store an implicit versioning mechanism allows simultaneous access by the transaction entity and the query entity to the shared disk storage, where the transaction entity is presented the current data and wherein the query entity is presented a recent and consistent version of the data. Furthermore, a single copy of all but recently updated pages is maintained by the intelligent page store, and the query and transaction entities operate independently of each other.

As relational database queries become more complex, parallel intra-query processing, which exploits a large number of processors cooperating on the same query, has become important as a means of improving query response times, and providing incremental growth. On the other hand, transaction processing is, for the most part, not amenable to intra-transaction parallelism, but requires the support of a large number of concurrent transactions with sub-second response times. Reducing data contention by shortening lock hold times becomes critical as the transaction rate increases. This favors large processors with shared buffers. Therefore, a principal objective of this invention is to provide a logical database with two paths for accessing data: one for database transactions, and another for adhoc queries. This allows the transaction and query processing systems to be independently optimized, while providing access to the same data. For instance, update and transaction traffic can exploit the performance of large processors in tightly coupled shared memory configurations, while complex queries against the same data can be handled by parallel database software on loosely coupled micro-processors.

In the environment that supports transactions and queries with the above characteristics, further objectives of this invention are as follows:

- Disks and disk controllers are a significant component of total cost when a large database is present. Thus the disk space for combined transaction and query processing should be minimized. Thus, an objective of this invention is that online data should be shared by transactions and queries.
- Complex queries will sometimes have execution times, and lock holds which are significantly longer than the response time of the "structured transaction" for which throughput is important. Therefore, yet another objective of this invention is that the complex queries should see a consistent view of the database data without withholding locks from the transaction traffic.
- It is still another objective that the transaction processing database software and the query processing DB software should be effectively decoupled (no access to each others buffers in memory or exchange of lock information). In general this allows software for transaction and query processing to be independently optimized.

These, and other, objects, advantages, and features of the invention will be more apparent from the following description and the appended drawings.

DESCRIPTION OF THE PREFERRED EMBODIMENT

Prior art transaction and query systems

Figure 1:
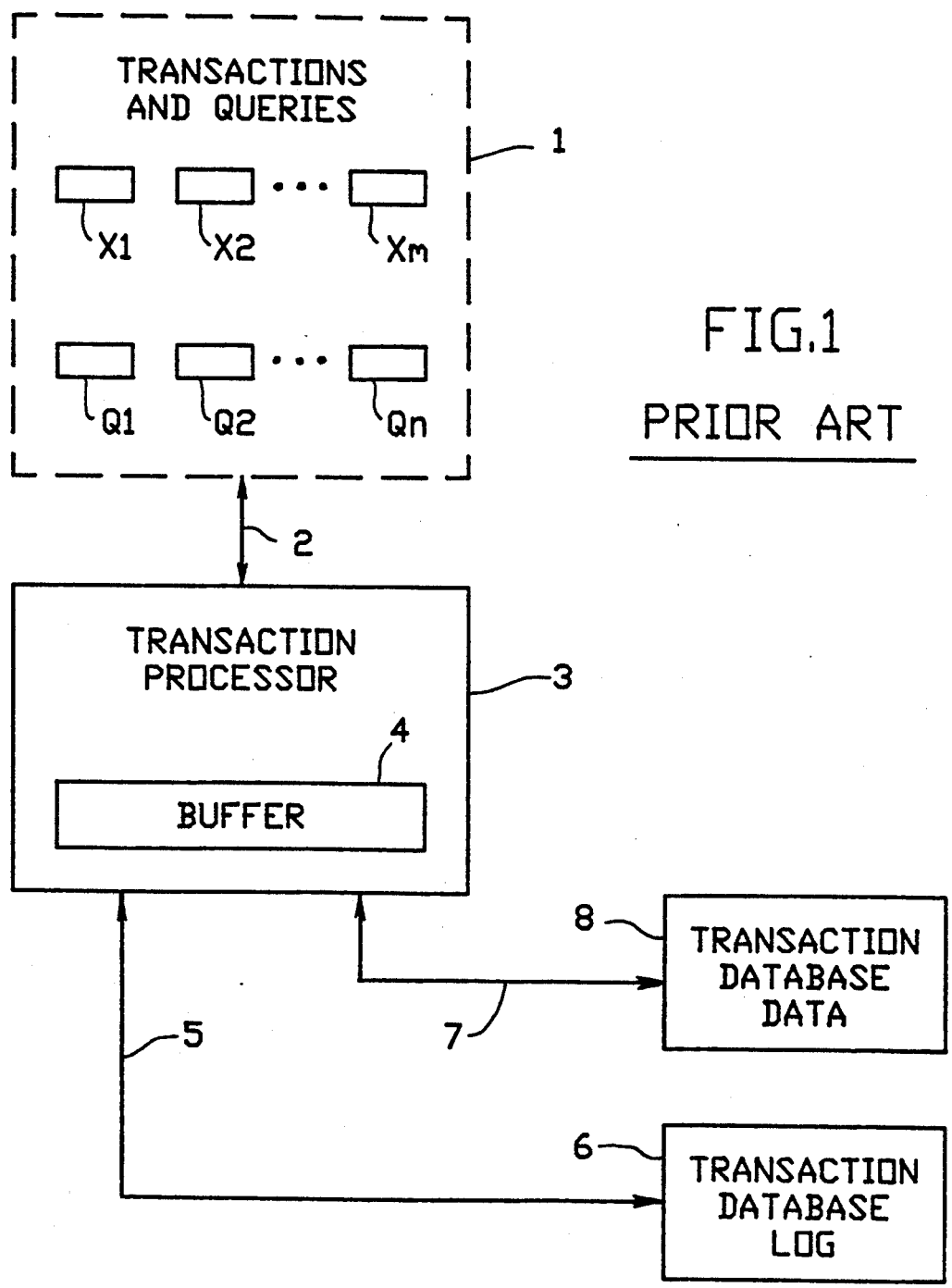
FIG. 1 is a schematic diagram describing the relevant system structure for prior art transaction and query systems.

To simplify the description of our invention, we summarize the essential features of prior art systems for transaction and query processing with a schematic in FIG. 1.

In this figure, box 1 shows a set of Transactions X1, X2, . . . Xm and Queries Q1, Q2, . . . Qn executing against the database. In our environment many transactions may need to be executing concurrently against the data to provide adequate throughput. However the view of data seen by these programs is that they execute serially, atomically and without interference.

A Transaction Processor 3 provides the concurrency control, locking, data access checking, index management, buffering and data protection needed to satisfy the view of data expected by Transactions 1. In most prior systems, update transactions and read only queries are not separated out and handled independently. The Transaction Processor is typically tuned to support the required throughput of Transactions. Some concurrent queries are also supported on this Transaction Processor but difficulties arise when a high throughput of update transactions is required in the presence of concurrent much longer running read-only queries.

Interaction between Transactions 1 and the Transaction Processor 3 consists of data access requests to read and write database records and information on when to commit or abort transactions. This is illustrated as Interface 2.

The word processor in the Transaction Processor is not meant to imply any particular system organization, machine packaging or physical unit boundaries. The Transaction Processor function could execute on a single physical processor, multiprocessor network of clustered processors or as a component sharing a processing system with other functions. We freely use processor in this way from now on.

An important component of the Transaction Processor is the Buffer 4. This is a pool of fast access storage (such as electronic memory) managed by the Transaction Processor. To read or modify database data, pages must be read into the Buffer from pages of Transaction Database Data 8 stored on a non-volatile medium (such as magnetic disks). Updates are made to pages in the Buffer which must eventually be written back to the non-volatile Database Data storage.

Transaction processing also makes use of a Transaction Database Log 6 to protect the database data from transaction aborts and system failures. The Transaction Database Log must be stored on non-volatile storage (such as magnetic disks). Standard terminology and algorithms describing what the transaction processor should write into the log and how it should be coordinated with buffer management are described in C. Mohan, D. Haderle, B Lindsay, H Pirahesh, P. Schwarz, "ARIES: A Transaction method supporting fine granularity, locking and partial rollbacks using write ahead locking", IBM Research Report RJ 6649 1/23/89, and R. A. Cruz, "Data Recovery in IBM Database 2", IBM Systems Journal, Vol 23 no 2 1984.

The Transaction Database Log 6 and Transaction Database Data 8 must both be stored on non-volatile storage. This is usually provided using magnetic disks but any comparable storage medium would suffice. The Transaction Processor issues streams of page read and write requests for the log via Interface 5 and for the Database Data via Interface 7. The content of these page read and write commands is defined by the Transaction Processor. The basic requirement to provide the non-volatile storage services required by Interfaces 5 and 7 is that any page once written can have its contents exactly retrieved by a read request at any later time.

System structure for intelligent page store method and apparatus

Figure 2:
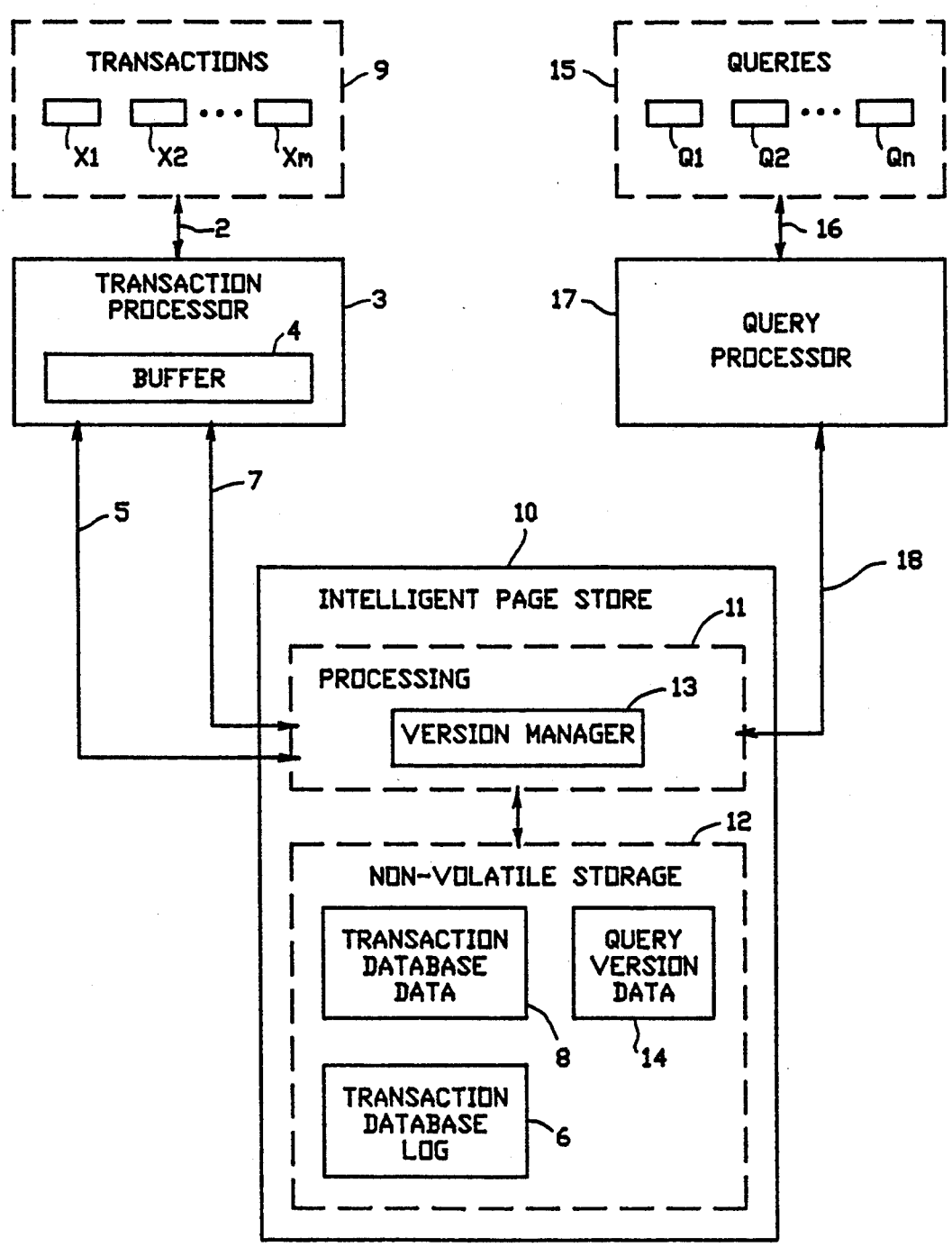
FIG. 2 is a schematic diagram of the system structure for the preferred embodiment of the invention: an intelligent page store for concurrent and consistent access to data by transactions and queries.

Referring now to FIG. 2, there is shown a block diagram of the system structure for our invention: an intelligent page store scheme to allow concurrent processing of queries and transactions.

It consists of a Transaction Processor 3, a Query Processor 17, and an Intelligent Page Store 10. A fundamental difference between this and the prior art transaction and query systems is that update Transactions are separated out from Queries and served independently by a Transaction Processor and a Query Processor. The Intelligent Page Store provides the Transaction and Query Processors with access to shared physical pages of the database in a way which supports important performance requirements (concurrent transaction and query processing) at minimal cost in the amount of non-volatile storage required.

The set of Transactions 9 supported by the Transaction Processor contains only update transactions and read-only transactions which require access to current data from the database. This is represented by the subset X1,X2, ... Xm of the Transactions And Queries 1 handled by the Transaction Processor 3 in FIG. 1. Transactions see the database data with the same view as in prior art-as atomic, non-interfering, serialized actions. Thus is illustrated by the fact that they interact with the Transaction Processor 3 via the same Interface 2 of record access requests and commit/abort information.

The function of the Transaction Processor 3 and its Buffer 4 in this figure are the same as in FIG. 1. Together they provide, buffering locking, concurrency control, index management services to support the view of data expected by Transactions X1,X2, ... Xm. The Transaction Processor continues to write its recovery log with a stream of page read and write requests via Interface 5 just as it would if the recovery log were stored directly on non-volatile storage attached to it. It also reads and writes database data pages via Interface 7 exactly as in prior art.

The Query Processor 17 supports read-only queries which can accept data which is not completely current provided that it is consistent. The set of Queries 15 is shown with example queries Q1,Q2, ... Qn which were in prior art served by the Transaction Processor. Queries Q1,Q2, ... Qn have explicitly been identified and separated from Transactions X1,X2, ... Xm so that they can be processed independently. Queries received via this separate interface are processed with the assumption that they are read-only and do not need completely current data. The separate Interface, a stream of record read accesses, known to contain only requests from queries is shown as Interface 16.

The Query Processor 17 must provide, access checking, index management, buffering etc. for queries. It is possible for the same software and hardware processing to be used for Query Processor 17 as was used for Transaction Processor 3 in prior art where it also served queries. However since most existing database systems are driven by the requirement to support adequate transaction throughput, having query processing handled by a separate entity allows retuning or redesign of the software and hardware processing to support read only queries alone. Since the requirements for concurrency control, locking and data protection in a query only system are substantially relaxed relative to general purpose transaction processing, considerable performance and cost performance gains become possible.

The Query Processor 17 will include some internal page buffering, but since the buffer management scheme may differ from that used in Buffer 4, buffering is not explicitly identified as a subcomponent. Interface 18 enables the Query Processor 17 to request pages of database data via a stream of page read requests. The data supplied presents a consistent view of the database data from some recent time.

The Intelligent Page Store 10 is a new concept which makes the separated processing of transactions and queries feasible without great cost in non-volatile storage (independent copies of all the database data for use by transaction and query processing respectively).

The Intelligent Page Store contains a Processing part 11 and a Non-Volatile Storage part 12. The Processing in the Intelligent Page Store consists of a Version Manager 13, which handles the page read and write requests from the Transaction and Query Processors via Interfaces 5,7,18. The Non-Volatile Storage in the Intelligent Page Store acts as a repository for the Transaction Database Log 6 and the Transaction Database Data 8. This Transaction Database Data is exactly that shown as 8 in FIG. 1, i.e. it is the backing storage for the current copy of every page which the Transaction Processor 6 has written to Non-Volatile Storage. The Intelligent Page Store provides additional Non-Volatile Storage for pages of Query Version Data 14. These allow a consistent query view of the database to be presented to the Query Processor via requests in Interface 18.

The function of the Version Manager 13 is to control access to shared logical pages of data by the Transaction Processor and Query Processor while preventing them from affecting each other's performance significantly, and minimizing total requirements for physical non-volatile storage. As a result the total non-volatile storage needed to save the Transaction Database Data 8 and the Query Version Data 14 is considerably less than twice the amount which would have been needed for Transaction Database Data in the prior art.

The Version Manager 13, responds to page read requests from the Query Processor so as to present a recent consistent version of database data via Interface 18, and at the same time to appear as simple non-volatile storage in response to requests from the Transaction Processor via Interfaces 5 and 7.

In order to prevent long running complex queries from locking out transaction updates on data read by the queries while preserving consistent access, queries see a consistent query snap-shot of the data; transaction updates are made to a logically separate transaction version. However, in order to share most of the same pages between the transaction and query versions of the data all corresponding logical pages of the transaction and query version data are supported from a single page of physical storage for pages which have been updated by a transaction since the query version was created by a process called database snapshot. We refer to this method of using shared physical pages to support independent transaction and query views as implicit versioning. The method is described in more detail using FIG. 3 and FIG. 4.

The Intelligent Page Store also includes a mechanism for determining when a new time step should be taken. This can be based on an internal algorithm or an external prompt from users, the Transaction Processor or the Query Processor.

To implement implicit versioning, the Version Manager 13 is responsible for routing page accesses from both transaction and query processing to the correct physical pages, for maintaining and managing versions of pages, for initiating and processing the creation of new query snapshots and for recovering and reusing physical storage from old page versions.

The Transaction Database Log 6 saved on Non-Volatile Storage 12 in the Intelligent Page Store 10, is exactly the information which the Transaction Processor 3 needs to save on non-volatile storage to protect database data against transaction aborts and system failures. The Version Manager 13 in the Intelligent Page Store responds to read and write requests in the log Interface 5 saving the information in the Transaction Database Log 6 on the Intelligent Page Store Non-Volatile Storage and returning it to subsequent read requests. The advantage of having the Database Log in the Intelligent Page Store is that the log information can be used to create consistent versions of database data without disturbing the Transaction Processor or reducing its throughput. Since a log is maintained only for update transactions and the Query Processor needs no access to transaction log information, the amount of non-volatile storage required to store the Database Log in the Page Store is the same as if the log were directly attached to the Transaction Processor as in prior art.

Similarly the Version Manager responds to Transaction Database Data page read and write requests in Interface 7 by saving page images in the Intelligent Page Store Non-Volatile Storage for Transaction Database Data 8 and returning them on subsequent read requests. This enables the Version Manager to create an additional physical copy of pages in Query Version Data 14 to support a consistent view of the database for queries only if some transaction has modified the page since the query version was created by the database snapshot processing. Since non-volatile storage is a significant component of the cost of database installations, avoiding unnecessary separate physical copies of pages for the Transaction and Query Processors is important. Implicit versioning, described in FIG. 3, and FIG. 4 includes an efficient scheme for determining when a copy of a database data page must be made to meet the requirement of presenting a consistent view to queries and the appearance of a non-volatile medium to transaction processing. This enables queries and transactions to execute concurrently without unnecessary replication of the database pages and hence at minimal cost.

The Non-Volatile Storage 12 in the Intelligent Page Store 10 can be implemented with any standard non-volatile medium (such as magnetic disks) for storing the Transaction Database Log 6, Transaction Database Data 8 and Query Version Data 14.

Implicit Versioning: management of query versions

Figure 3:
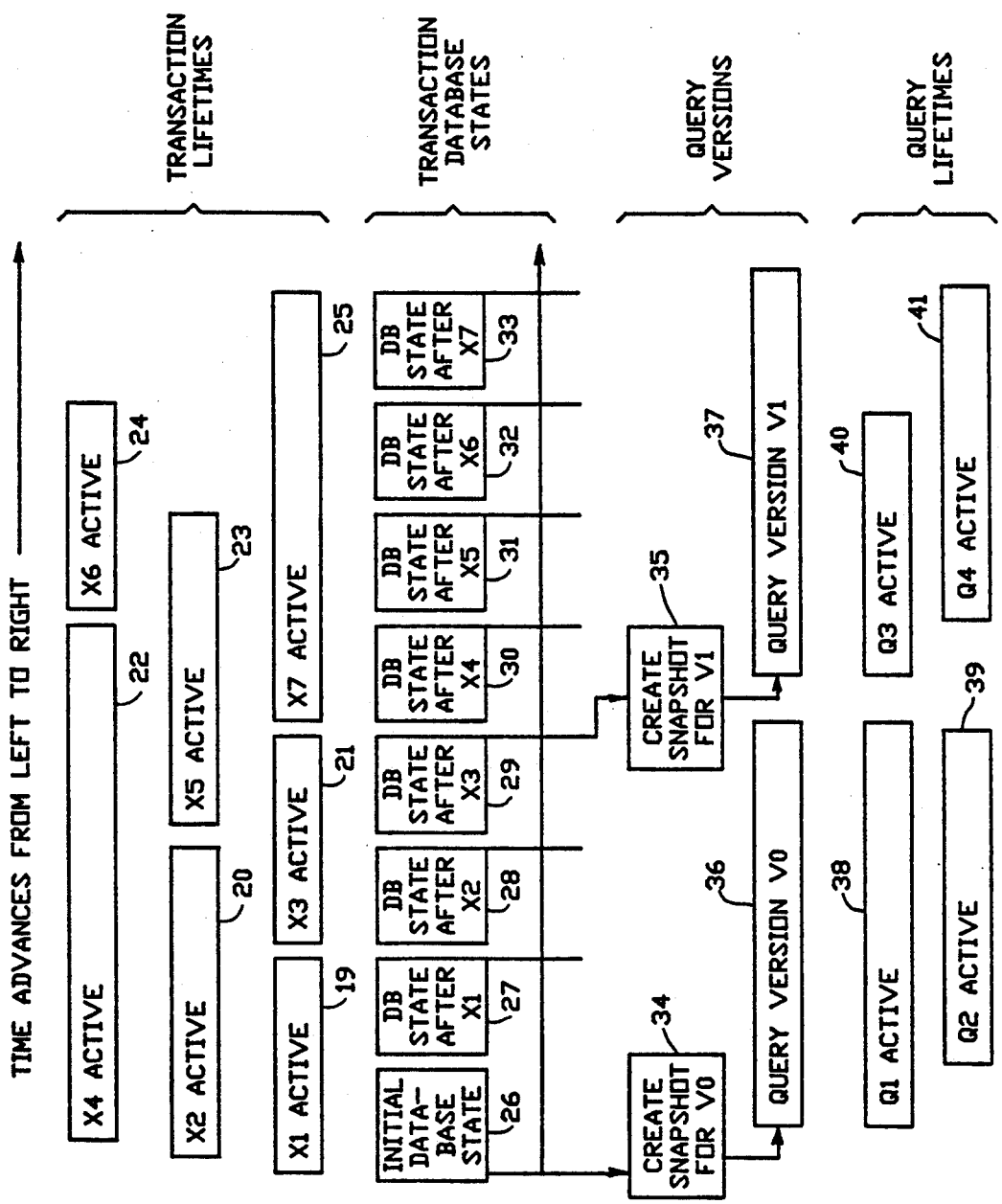
FIG. 3 is a state-time diagram showing when database snapshots are created, what it means for them to be consistent and what it means to maintain a query version.

FIG. 3 is a state diagram defining implicit versioning by showing the relationship between database states, query snapshots, transactions and queries as time progresses. The diagram is not to scale in the sense in the sense that queries and query versions may have lifetimes which may be 100 times or 1000 times longer than typical transaction lifetimes.

We describe implicit versioning for the case where transaction access to current data and one query snapshot are supported. A straightforward extension of the scheme can reduce disruption when new snapshots are created by allowing additional query versions at the cost of additional non-volatile storage.

FIG. 3 is a state-time diagram with time advancing from left to right. Events directly above each other are simultaneous.

Referring to FIG. 3, the top section shows Lifetimes 19,20,21,22,23,24,25 of sample update transactions X1,X2, . . . X7 respectively executing on the Transaction Processor. The left end of each of these boxes shows when an update transaction begins execution and starts holding locks and database resources. The right hand end shows when it ends and commits its updates in the database. Notice that transactions are overlapped (execute concurrently) and are committed in an order which is not necessarily their order of starting.

The next section of FIG. 3 shows states of the database of the database as it evolves in time as a result of update transactions X1,X2, . . . X7 being applied. The Initial Database State 26 represents the state of the database at some starting time. Subsequent states of the database 27,28,29,30,31,32,33 show the changed states after transactions X1,X2, . . . X7 commit in order. Notice that the transaction database state advances in small granular steps each containing the updates of one transaction. The order in which transactions commit X1 before X2, X2 before X3, etc will be exactly reflected in the Transaction Database Log 6 generated by the Transaction Processor 3. In these state diagrams, all updates from preceding transactions are included and no updated from following transactions are included. For example state 30 "database state after transaction X4" includes the updates from X1, X2, X3 and X4 but no updates from X5, X6 or X7. We use the term consistent to define this property of a database state.

The next section of FIG. 3 including 34, 35, 36, 37 shows Query Versions being created by taking a snapshot of database state and maintained for use by queries. In action 34 the Version Manager takes a snapshot of the Initial Database State 26 to create Query Version V0 whose lifetime is shown by 36. The length of 36 shows exactly the lifetime during which query version V0 is available for use by queries running on the Query Processor. Action 35 shows the Version Manager at some time after transaction X3 has committed, taking a snapshot of the consistent database state 29 and using it to create Query Version V1. The lifetime during which Query Version V1 is available to queries is shown by the exact length of 37.

The next section of FIG. 3 shows sample query lifetimes: the period during which Q1 and Q2 are being processed are shown active Lifetimes 39 and 39 respectively. Throughout this time Q1 and Q2 must have access to the data of "Query Version V0" 36. Queries Q3 and Q4 have Lifetimes 40, 41 respectively; these queries must have access to the data of "Query Version V1" 37.

The implicit versioning scheme implemented by the Version Manager 11 has to deal with the fact, that the transaction processor 3 will write out pages of data via Interface 7 in a way which optimizes the use of its Buffer 4. In particular pages will be written out including uncommitted data and without any guarantee that the set of pages written out represent a consistent state of the transaction database in the sense of database States 26, 27, 28, 29, 30, 31, 32, 33. The Intelligent Page Store, has to receive these pages and return them on subsequent read requests without disturbing the view of data seen by longer running queries in the Query Processor; these must see the Query Versions 36, 37. In implicit versioning, this is achieved by advancing the version of data seen by the queries in discrete time steps. At each time stem a new query snapshot is created and made visible to queries. Each snapshot is a consistent view of committed database data at some recent time. Between time steps, the Intelligent Page Store presents a constant view of the data to queries. When the Transaction Processor writes out updated pages to the Intelligent Page Store, the updated pages are saved but not made visible to the queries until the next time step.

Implicit Versioning: management of page copies

Implicit versioning also determines accurately when an additional copy of a database data page is required to support the current transactional and query views. This enables non-volatile storage requirements to be minimized. The management of page copies by implicit versioning is described by a time state diagram in FIG. 4. Time advances from left to right in this diagram. Events directly above each other are simultaneous.

The initial state of the database data i.e. the combined Transaction Database Data 8 and the Query Version Data 14, in the Intelligent Page Store 10 is shown as 47. This is actually a composite state represented by a set of logical pages P1, P2, ... P7 which store a set of page values. We represent the values stored in these pages by letters "a", "b", "c", "d", "e", "f", "g" respectively. This database state is assumed to be a consistent state of the transaction database and the actual state of transaction data, as would occur if transaction processing had just restarted after being quiesced. State 26 in in FIG. 3 illustrated this case. We assume that a snapshot of this consistent state has been taken as shown in Action 34 and a Query Version created corresponding to it as in "Query Version VO" 36.

A key point is that in this State 47 no page is stored twice; a single copy of each of pages P1, P2, ... P7 is adequate to support correct transaction and query views of the database data. This set of physical pages is acting as Transaction Database Data 8; no additional physical storage is required for Query Version Data 14 at this time.

A sequence of page read and write request Actions 42, 43, 44, 45 from the Transaction Processor via Interface 7 affect the page data stored in the Intelligent Page Store. Action 46 shows the effect of subsequently creating a new query version by taking a snapshot of the database. The sequence of states of data storage in resulting from these operations is shown as States 48, 49, 50, 51, 52.

Action 42 is a request from the Transaction Processor to read the value of page P5. It receives "e" the current value in the page store. The values stored for pages P1, P2, ... P7 have not been changed and no copies have been made.

The next Action 43 is a request from the Transaction Processor to write the value "x" into page P3. State 49 shows that a copy of page P3 is made so that both the old value "c" and the new value "x" can be saved. At this point queries will see the old value "c" residing in Query Version Data 14, whereas Transaction Processor requests to non-volatile storage will see the new value "x" in a copy of the page in Transaction Database Data.

The next Action 44 is a request from the Transaction Processor to read page P3. This will receive "x" the value of the page written there previously at the request of the Transaction Processor. State 50, the state of the page store after Action 44, shows that the state of the page store is not changed as a result of this read operation.

Action 45 is a subsequent write to page P3 from the Transaction Processor requests that value "y" be written. State 51 shows that the new value "y" is written over the old transaction value "x" but that no new copy of the page is made since the value needed by queries in this time step namely "c" is already saved in a copy.

When a new query version is created by taking a snapshot of the database in Action 46, the old query value "c" for page P3 can be discarded and the non-volatile storage used for this copy recovered for reuse as is illustrated by State 52. Assuming that the transaction which was responsible for writing the value "y" into page P3 has committed before the "snapshot" is made, then this is the value which will be made available to queries in the next timestep.

Read requests from the Query Processor in the first query time interval will see values "a", "b", "c", "d", "e", "f", "g" for pages P1, P2, ... P7 regardless of when the requests are made in this time interval as is shown by "V0 READS from QUERY PROCESSOR" 53. Read requests from the following interval will see the new values "a", "b", "y", "d", "e", "f", "g" in for logical pages P1, P2, ... P7 as is shown by "V1 READS from QUERY PROCESSOR" 54.

Note that by state 52, physical storage used for Query Version Data 14 is recovered for reuse by the next query version.

Figure 4:
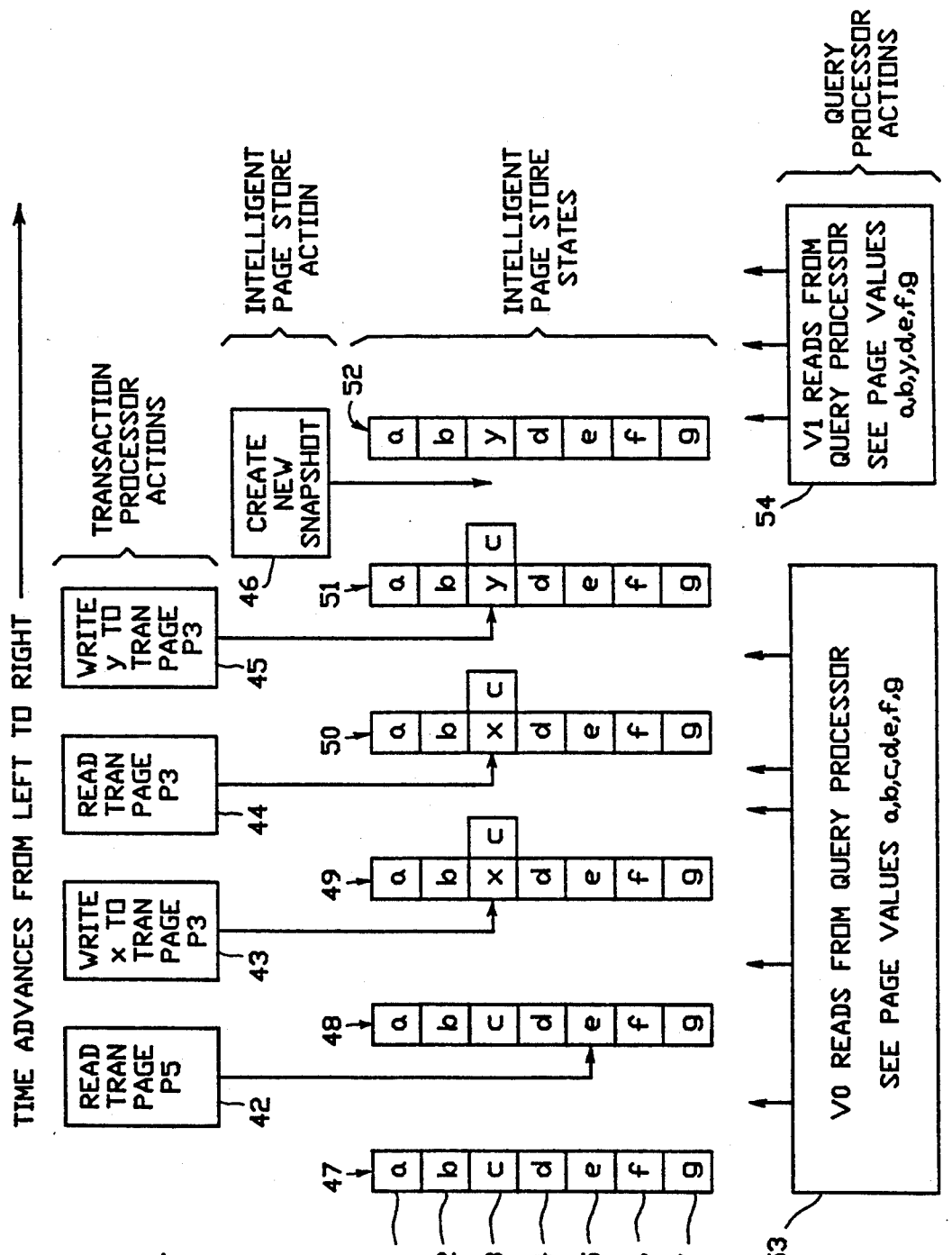
FIG. 4 is a state-time diagram showing how the number of copies of each page in the page store varies over time as a result of write requests from the transaction processor and new query version creation.

FIG. 4 is logical; current databases often contain more than 10,000 data pages rather than the seven used in this description by example.

Logic in Version Manager implementing Implicit Versioning

Figure 5:
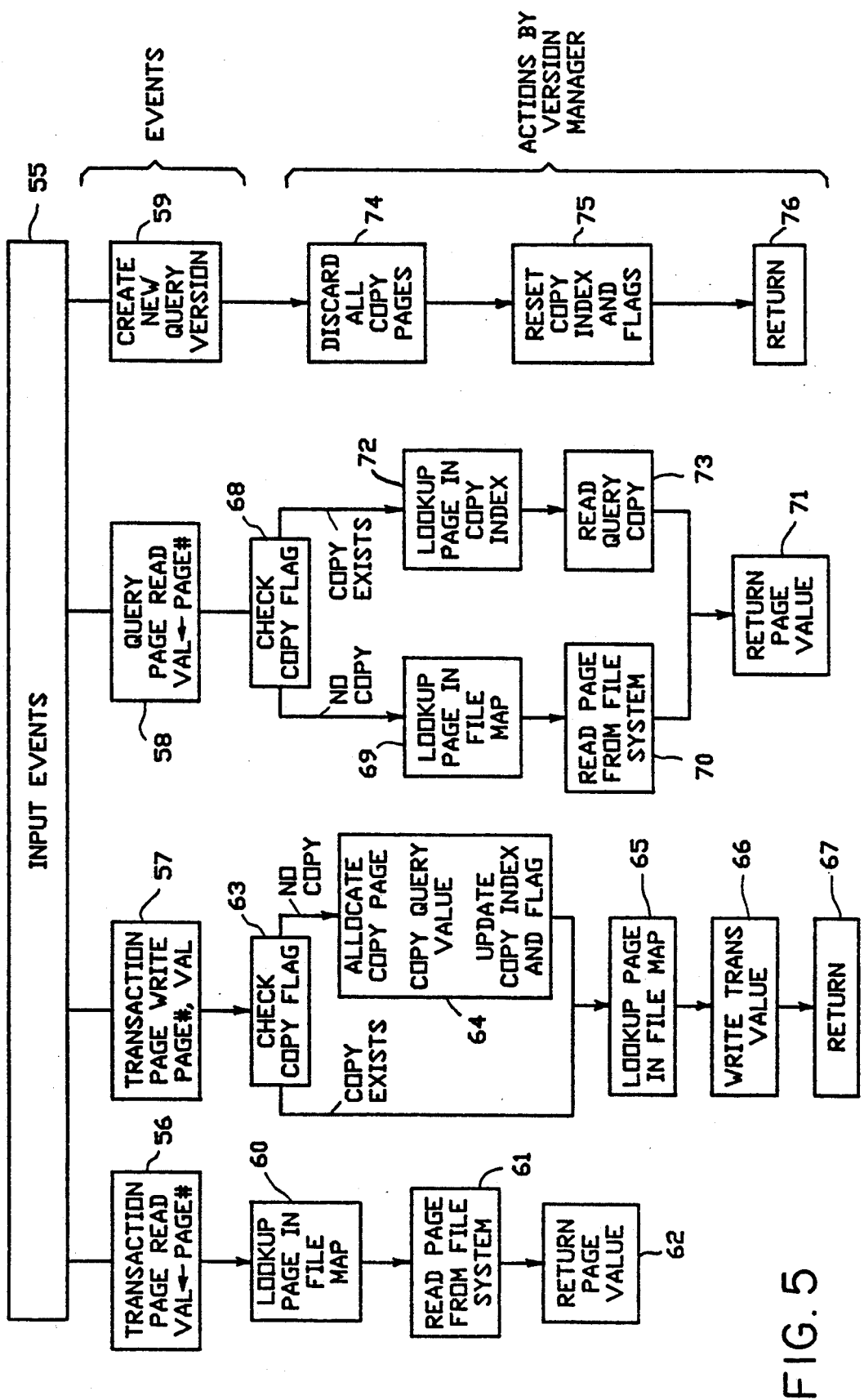
FIG. 5 defines the algorithms and logic used by the intelligent page store in the preferred embodiment to implement implicit versioning.

FIG. 5 shows the logic in the Version Manager 13 used to implement implicit versioning. It is a control flow graph.

The data structures in the Version Manager consist of:
  page to file map This maps page numbers to the location in the file system where the primary copy of that logical page is stored. At times when the transaction database state is identical to the current Query Version (e.g. state 47 in FIG. 4) the Transaction Database Data 8 will consist of the primary copy of each logical page in the database.
  copy flag vector This maintains one bit of information for each logical page in the database indicating whether an auxiliary copy has been made as part of Query Version Data 14.
  copy index This locates where the auxiliary page is in work storage. It may have the form of a B-Tree.

Referring now to the flowchart in FIG. 5. The Input Events 55 to the Version Manager are a "request to read a page" 56, or "write a page" 57, from the Transaction Processor, to "read a page from the query processor" 58 or to "create a new query version" 59.

On receiving Event 56, "request from the Transaction Processor to read a page" with the number of the page to read and a return page value expected, Action 60 looks up the location of this page using the page to file map. Action 61 obtains the page value by reading from the file system at this location and Action 62 returns this value in response to the request.

On receiving Event 57, "Page Write from the Transaction Processor" with the page number to write and value to be written, the copy flag vector is checked in Action 63 to determine whether an auxiliary copy of the page has already been made with the data needed by the current query version. If not Action 64 allocates space for a query version copy out of a work space of page frames, copies the query value of the page previously stored in the primary copy to this allocated space, updates the copy index to point to the copy and sets the flag in the copy flag vector corresponding to this logical page to indicate that a copy has been made.

From this point processing is the same whether or not a query copy had to be made. In Action 65 the location of the primary copy is determined by looking up the requested page number in the page to file map, the new value is written over any previous value in Action 66 and the request is then completed by Action 67. Our preferred embodiment given present query and transaction system characteristics is that query versions are made "out of position" and the primary copy used for the most recent transaction value. This choice is not essential to the implicit versioning concept.

On receiving Event 58, a "Page read request from the Query Processor" with a page number to read and a returned value expected, Action 68 checks the copy vector is checked to determine whether a query copy of the page has already been made. If it has, the copy index is used to locate this copy in Action 72 and the value read from this location by Action 73. If not, Action 69 uses the page to file map to locate the primary copy and Action 70 obtains the page value by reading from this location in the file system. Action 71 returns to the requester the resulting value from whichever of these paths is taken.

When a new query version is to be made, Event 59, assuming that the set of primary pages represents a consistent state of the transaction database, the auxiliary pages are freed up, and their contents discarded in Action 74. Then Action 75 resets the copy index and copy flag vector to indicate that no auxiliary query version pages currently exist. Finally Action 76 denotes the completion of processing for this event.

Methods for ensuring that the set of primary pages in the page store represent a consistent state of the transaction base are described below.

Methods for forcing a consistent transaction database state to the page store One method for forcing a transaction consistent snapshot of the database to disk is to get all transactions on the Transaction Processor to a consistent state by quiescing them or having them halt immediately at a point where they have left the database in a consistent state and then force the Buffer 4.

If the transaction processing entity provides a bound on the length of time which a modified committed page can remain in memory without being flushed to disk then the preferred embodiment (with least disruption to transaction processing) is the algorithm for time step without disturbance to transaction traffic described below.

Details of time step with guaranteed pageout

This section describes in more detail the time step algorithm for a database which guarantees that any modified page will be written out before time T (after it is modified in the buffer and the transaction commits).

For time t, define $A(t)$ to be the minimum of the starting times of all transactions active at time t. $A(t)$ is always before or equal to t.

Let $LSN\_t$ denote the log offset reached at time t. Because all transaction activity earlier than $A(t)$ has been resolved, by time t, for a page update in the log at $LSN\_s$ where $LSN\_s$ & Al. $LSN\_A(t)$, it is determinable by inspection of the log interval $(LAN\_s, LSN\_t)$ whether this update was committed or aborted.

We give a precise definition of what it means for a transaction processing entity to guarantee pageout within time T. For any page update which commits at time s then a version of the page including this update (and possibly later operations) will be flushed to disk by time $s+T$; for any page update which aborts at time s and has allowed an incorrect version of the page to be flushed to disk, then a version of the page with the update undone (and possibly later operations overwritten) will be forced to disk by time $s+T$.

For a transaction processing entity which guarantees pageout within time T, and a given time TS, then every page update which precedes $A(TS-T)$ will be reflected "on disk" by time TS (because the transaction responsible commits or aborts by time TS-T and the result of its operations are sure to be flushed to disk at least time T later).

To take a query processing time step at time TS the following actions are needed:

1. Instantly after time TS, any action of transaction processing to write forces a prequery copy of the page to be made with the image that existed at time TS.

2. Times $A(TS)$ and $A(TS-T)$ are determined. This can be done (in the Intelligent Page Store) by starting from the transaction table written out in a checkpoint record in the log and running forward through the log noting the start and end of new transactions.

3. By processing the log interval $(LSN\_A(TS-T), LSN\_TS)$ against the image of the database in the Intelligent Page Store at time TS is is possible to construct a correct snapshot of the database reflecting all transactions which had committed by time $A(TS)$.

4. Note that every update preceding $A(TS-T)$ has either committed or aborted, and the corresponding effect or undo of this update is reflected in the pre-query image in the Intelligent Page Store.

5. We make a forward pass through the log from $LSN\_A(TS-T)$ to $LSN\_TS$. For every page update before $LSN\_A(TS)$, it can be determined whether the owning transaction committed before $LSN\_A(TS)$; no page update in the interval $(LSN\_A(TS), LSN\_TS)$ can have committed by $A(TS)$. Further more by comparing the log position of the update record with the LSN in the pre-query page, we can determine whether any update which commits before $A(TS)$ is reflected there. Since we meet such updates in order (moving forward through the log), if they are not in the pre-query copy of the page, they can be applied. The algorithm for processing page updates from the log is as follows:

```
for each page update (going forward through the log)
    if transaction commit before A(TS)
        if LSN(update) &Ar. LSN(preQDB page) then
            apply the update
              —since we started in the log at LSN_A(TS-T)
              —this must be the "next update in sequence"
        else LSN(update) less or equal LSN (preQDB
            page) then skip
              —this update already reflected in preQDB copy
    else transaction aborted or committed after A(TS)
        (all updates later than A(TS) in this category)
        if LSN(update) &Ar. LSN(preQDB page) then
            skip
              —the update was not flushed out to preQDB
        else LSN(update)=LSN(preQDB page) undo this
            update and any previous stacked undos for the
            page
              —this update made it to the page store but no
                later
              —version of the page did; undo the update then
                undo
              —any previously stacked updates for the page in
                reverse
              —order
        else LSN(update) &Al. LSN (preQDB page) stack
            the undo to be applied later when all undos can
            be applied in reverse order to the preQDB page
            available
```

6. On completion of this log pass the preQDB pages reflect the database image for all transactions which committed by A(TS)

If there is not room in memory to manage a stack of undo operations on pages this can be handled by marking and chaining log records and making a second reverse pass through the log from LSN_TS towards LSN_A(TS-T).

Whenever a preQDB page is modified during the log processing, this is done with the technique for saving the image of the page described in the "Suspend and Flush" algorithm. Formally:
   if there is a preQDB copy already—separate from the ADB version of the page
       then modify the existing preQDB page
       else create a preQDB version—with the time TS image
           apply the undo or redo operation to this There is no reason for the pageout guarantee time to be the same at all times. After we select time TS for the time step, all that is necessary is to determine a time such that the effect of all page updates preceding that time has been resolved and forced to disk by TS. For a database which maintains a Dirty Page Table (DPT) of pages which have been modified in memory but not paged out, A(min(DPT(TS))) will have this property.

In describing the time step algorithm we have not discussed failure and restart of the transaction processing entity. The simplest general approach (and our preferred embodiment) is that if the transaction processing entity fails, it is recovered before the next query time step is taken. Interleaving of time step advance with transaction system recovery is feasible but sensitive to the particular recovery strategy used by the transaction system.

The guarantee of pageout would be the time T within which every resolved update would be flushed to disk given that no transaction processing system failure occurred.

Ownership of database and log storage

In the above we have assumed that the Intelligent Page Store has ownership of the storage used for database pages and the log from transaction processing. This ensures that the Intelligent Page Store has free access to this information.

Computation of quantities such as A(t) is most easily done by having the Intelligent Page Store read the Active Transaction Table from checkpoints in the log and note from the log stream subsequent transaction begin and end operations.

Similarly, the simplest way to compute T is to read the dirty page table form a log checkpoint record, and if more accuracy is required, advance it in time by checking the store for subsequently flushed pages.

Avoiding disruption to query processing during time step advance

As described above, all queries must execute against a valid query version of the data. Therefore, when a new snapshot is being created no queries should be running. This disruption of query processing can be avoided at the cost of at most one additional copy of each modified page. One can then allow queries running against the last query version (A) to continue, while new queries see the new query version (B). A further query version (C) is not created until all queries accessing version A have completed, and version A has been deleted.

Sharing indexes and metadata between transaction and Query Processors

The Intelligent Page Store has been described in terms of versioning the relational table data. The same technique will work without change to provide the Query Processor with access to indexes which have been built by the Transaction Processor catalog and other metadata. The implicit versioning will ensure that index and metadata pages made available in this way to the Query Processor is exactly synchronized and consistent with the query table data.

While the invention has been described in its preferred embodiment, it is to be understood that changes in form and details of the above description may be made without departing from the true scope and spirit of the invention.

We claim:

1. A database transaction and query processing system for simultaneously running transactions and queries against the same database without ever having a transaction wait for a query to complete or ever having a query wait for a transaction to complete, comprising:
   an intelligent page store for non-volatile storage of a primary version of each page of a database and for creating and maintaining at least one consistent snapshot version of said database for access by queries which do not require access to the most recently updated database pages, said intelligent page store maintaining only one physical copy of any page of said database which is the same in said primary version and said at least one snapshot version of said database;

a transaction processor having a buffer for receiving needed pages of said primary version of said database from said intelligent page store, said transaction processor running transactions only against said pages of said data base stored in said buffer of said transaction processor and forming an updated version of at least some of said pages stored in said buffer, said transaction processor sending back to said intelligent page store any updated pages of said database which are replaced in said buffer of said transaction processor, a most recently committed version of any particular page of said database possibly being stored in said buffer of said transaction processor instead of in said intelligent page store at any particular arbitrary time; and a query processor independent of said transaction processor for running queries against said at least one consistent snapshot version of said database, said at least one consistent version of said database being made available by said intelligent page store to said query processor;

wherein said intelligent page store creates a consistent snapshot version of said database by flushing said page buffer into said intelligent page store, said primary version of said database after said flushing being the consistent snapshot version.

2. A database system as defined in claim 1 wherein said transaction processor and said query processor are different physical entities.

3. A database system as defined in claim 1 wherein said transaction processor and said query processor are independent processes implemented on the same physical entity.

4. A database system as defined in claim 1 wherein said page store maintains more than one consistent snapshot version of said database.

5. A database system as defined in claim 1 having a database log and wherein said intelligent page store derives a consistent snapshot version from said primary version pages and said database log.

6. A database system as defined in claim 5 wherein said database log is stored in said intelligent page store.

7. A database system as defined in claim 1, wherein said intelligent page store has a first storage space for storing said primary version of each page of said database and a second storage space for storing at least one older version of some pages of said database.

8. A database transaction and query processing system for simultaneously running transactions and queries against the same database, comprising:

page store means for storing a primary version of each page of a database and for creating and maintaining a consistent snapshot version of said database, said page store means maintaining only one copy of any page of said database which is the same in said primary version and said snapshot version;

a transaction processor including: page buffer means for receiving needed pages of said primary version of said database from said page store means, transaction means for running transactions against said page stored in said buffer, and update means for sending back to said page store means any updated pages of said database which are formed in said page buffer means as a result of said transactions; and query processor means, coupled to said page store means and independent of said transaction processor, for running queries against the consistent snapshot version of said database;

wherein said page store means creates said consistent snapshot version of said database by flushing contents of said page buffer means into said page store means, said primary version of said database after said flushing being the consistent snapshot version.

* * * * *